US006876663B2

(12) United States Patent
Johnson et al.

(10) Patent No.: US 6,876,663 B2
(45) Date of Patent: Apr. 5, 2005

(54) SWITCHING SYSTEM

(75) Inventors: Ian David Johnson, Littlehampton (GB); Colin Martin Duxbury, Woodley (GB); Marek Stephen Piekarskl, Macclesfield (GB)

(73) Assignee: Xyratex Technology Limited (GB)

( * ) Notice: Subject to any disclaimer, the term of this patent is extended or adjusted under 35 U.S.C. 154(b) by 823 days.

(21) Appl. No.: 09/874,500

(22) Filed: Jun. 5, 2001

(65) Prior Publication Data

US 2002/0012344 A1 Jan. 31, 2002

(30) Foreign Application Priority Data

Jun. 6, 2000 (GB) .......................................... 001357105

(51) Int. Cl.[7] .............................................. H04L 12/28
(52) U.S. Cl. ...................................... 370/416; 370/418
(58) Field of Search ................................. 370/229–232, 370/235–236.2, 360, 389, 392, 395.1, 396, 395.21, 397–399, 394, 409, 412–418, 422

(56) References Cited

U.S. PATENT DOCUMENTS

| | | | | |
|---|---|---|---|---|
| 4,475,192 A | * | 10/1984 | Fernow et al. | 370/232 |
| 4,870,639 A | | 9/1989 | Hayashi et al. | |
| 5,515,359 A | * | 5/1996 | Zheng | 370/231 |
| 5,732,087 A | * | 3/1998 | Lauer et al. | 370/416 |
| 6,125,118 A | * | 9/2000 | Arnold | 370/397 |
| 6,501,731 B1 | * | 12/2002 | Chong et al. | 370/230.1 |
| 6,647,019 B1 | * | 11/2003 | McKeown et al. | 370/229 |

FOREIGN PATENT DOCUMENTS

| | | |
|---|---|---|
| EP | 1 026 856 A2 | 8/2000 |
| WO | WO94/17617 | 8/1994 |
| WO | WO99/33231 | 7/1999 |
| WO | WO00/38375 | 6/2000 |

OTHER PUBLICATIONS

"Tiny Tera: A Packet Switch Core" McKeown et al. IEEE Micro, IEEE Inc. New York, US, vol. 17, No. 1, 1997, pp. 26–33.

* cited by examiner

*Primary Examiner*—Duc Ho
*Assistant Examiner*—Phuongchau Ba Nguyen
(74) *Attorney, Agent, or Firm*—Wallenstein Wagner & Rockey, Ltd.

(57) ABSTRACT

A data switching device has ingress routers and egress routers interconnected by a switching matrix controlled by a controller. Each ingress router maintains one or more virtual output queues for each egress router. The switching matrix itself maintains a head-of queue buffer of cells which are to be transmitted. Each of these queues corresponds to one of the virtual output queues, and the cells stored in the switching matrix are replicated from the cells queuing in the respective virtual output queues. Thus, when it is determined that a connection is to be made between a given input and output of the switching matrix, a cell suitable for transmission along that connection is already available to the switching matrix. Upon receipt of a new cell by one of the ingress routers, the cell is stored in one of the virtual output queues of the ingress router corresponding to the egress router for the cell, and also written the corresponding head of queue buffer, if that buffer has space. If not, the cell is stored, and written to the head of queue buffer when that buffer has space for it.

16 Claims, 8 Drawing Sheets

SWITCHING SYSTEM

FIELD OF THE INVENTION

The present invention relates to devices and apparatus for data switching One example of the use of the present invention is to provide high bandwidth interconnection within systems in which two or more processors share memory.

BACKGROUND OF THE INVENTION

The ever-expanding requirements for processing-intensive computer applications are driving the market to produce systems of ever-greater power. Unfortunately, improvements in processor technology, though impressive, are insufficient to satisfy all of this demand.

One alternative possibility for creating a system with increased power is to operate several closely coupled processing nodes in tandem. Though each node operates in its own local memory space, the close coupling necessitates a degree of memory sharing. This shared memory can be implemented as a single central copy, or (more typically) replicated and distributed in the nodes' local memory. Either way this gives rise to the need for a high bandwidth inter-node communication system, in the former case to provide access to the central memory, and in the latter case to ensure that the distributed copies are kept coherent.

A node generating traffic through this communication system will frequently require a reply to its request before processing can continue. Thus, either the node must suspend processing, or (where possible) it must switch to another task which is not so stalled—either option will cost overall performance. Low latency in the inter-node communication system is therefore a prime requirement to minimize such loss.

In data communications systems, cell loss can be handled by higher layers in the protocol stack and can therefore be tolerated. By contrast, cell loss in processor interconnect systems is generally unacceptable due to the stalled requesting process, yet such systems typically operate with a minimum of protocol layers in order to keep down system latency. The physical layer must therefore implement a reliable delivery protocol in hardware.

Figure 1:
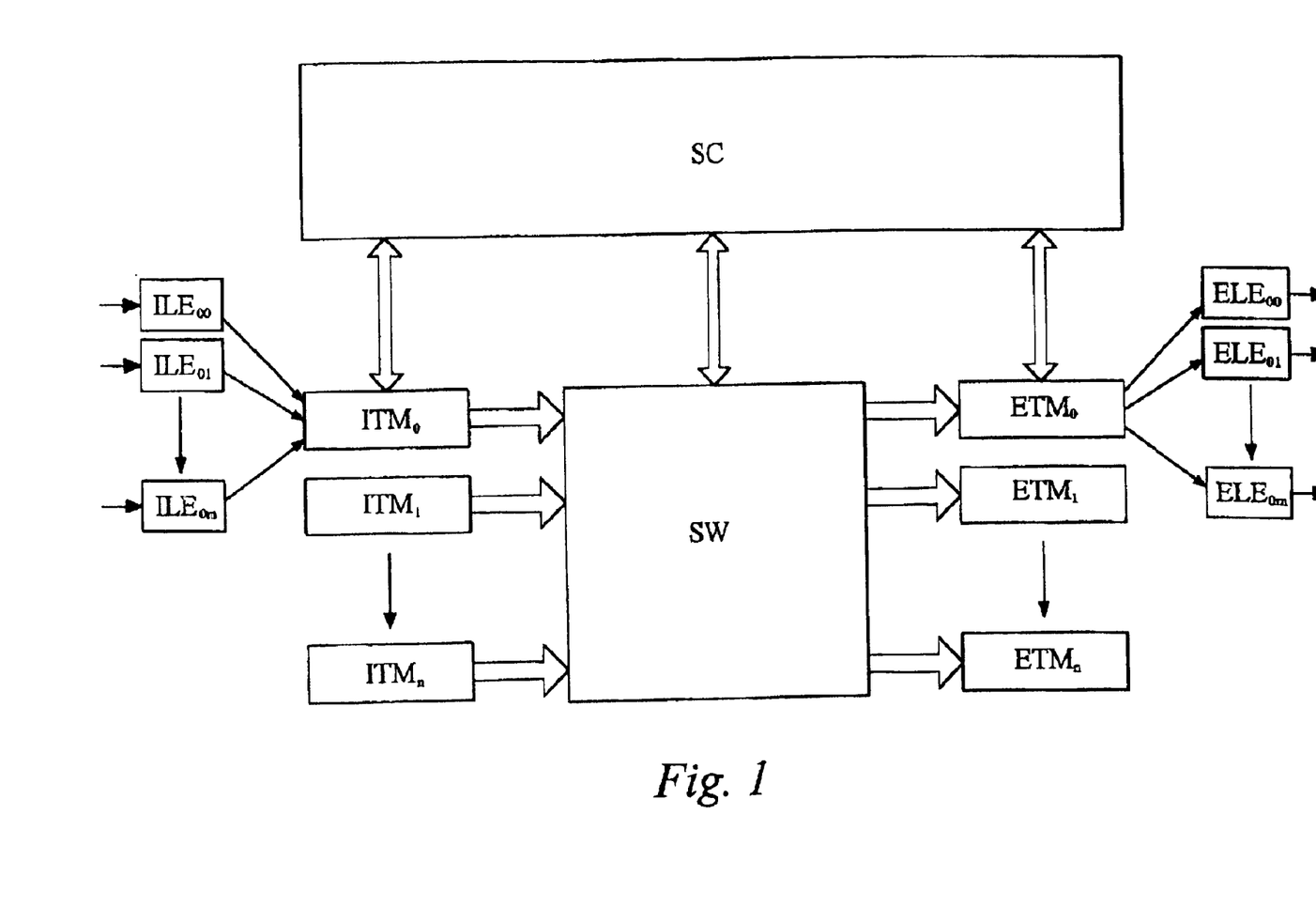
FIG. 1 shows the system of GB 9828144.7, and of an embodiment of the present invention.

In WO 00/38375, the disclosure of which is incorporated here in its entirety, we proposed a data switching apparatus which possesses inherent attributes of high bandwidth, scalability, low latency, small physical volume and low cost. Only limited details of this technology had been made publicly available by the priority date of the present application. It is illustrated in FIG. 1.

A switching system employs a number n+1 of routers, which may be di-directional. The information transmission aspect of the respective routers is expressed as "ingress routers" $ITM_0, ITM_1, \ldots ITM_n$. The information receiving aspect of the routers is expressed as the n+1 "egress routers" $ETM_0, ETM_1, \ldots ETM_n$. Each router receives information from one or more data sources (e.g. a set of processors constituting a "node"), e.g. ingress router $ITM_0$ receives information from m+1 data sources $ILE_{00}, \ldots, ILE_{0m}$. Similarly, each egress router sends information to one or more data outputs, e.g. egress router $ETM_0$ sends information to data sources $ELE_{00}, \ldots ELE_{0m}$. The master device SC and matrix device(s) SW constitute the central interconnect fabric (CIF). Cells for transmission through the matrix SW are of equal length, and are each associated with a priority level. Each ingress router maintains, for each egress router and for each priority level, a respective "virtual output queue" of cells of that priority level for transmission to that egress router when the matrix device SW connects that ingress router to that egress router. Each ingress router sends connection requests to the master device SC. The master device SC determines which ingress and egress routers to connect by a first arbitration process. Each ingress router, having been informed of which egress router it will be connected to, performs a second arbitration to determine which priority level of cell it will transmit to that egress router, and having determined the priority level, transmits the head of the virtual output queue for that priority level and that egress router to the matrix SW via the serial links to arrive at the same time as connection information sent directly from the master. In practice, the latter is significantly quicker than the former, and has to be artificially delayed in order to match the latency of the path via the router. In summary, the above system uses a memoryless fabric with all congestion buffering in the routers.

WO94/17617 discloses a switch according to the preamble of claim 1. The switching matrix includes a buffer which only is capable of storing one cell for each path through the switching matrix which can be formed during a singel switching cycle. Following a determination of which cells are to be transmitted through the switches, those cells leave the ingress routers, and are transmitted through the switching matrix. This passage includes temporary storage of the cells in the buffer as they pass through the cell, and at a time when they are no longer stored in the ingress routers.

SUMMARY OF THE INVENTION

The present invention aims to provide a new and useful data switching device and method.

In general terms, the present invention proposes that the switching matrix itself maintains a (e.g. short) head-of queue buffer of cells which are to be transmitted. Each of these queues corresponds to one of the virtual output queues stored by the ingress routers, and indeed the cells stored in the switching matrix are replicated from the first cells queuing in the respective virtual output queues. Thus, when it is determined that a connection is to be made between a given input and output of the switching matrix, a cell suitable for transmission along that connection is already available to the switching matrix. It is not necessary to obtain it from an ingress router. Upon receipt of a new cell by one of the ingress routers, the cell is stored in one of the virtual output queue(s) of the ingress router corresponding to the egress router for the cell. Each of the virtual output queues and the head of queue buffers may be a first-in-first-out (FIFO) queue, and the head of queue buffer may replicate the first few entries of the virtual output buffer This may be achieved, for example, by the ingress router, when it receives a new cell and writes it into a virtual output queue, also writing it to the corresponding head of queue buffer, if that buffer has space. If not, the cell may be stored, and written to the head of queue buffer when that buffer has space for it. The question of whether or not the buffer has space is answered by inspecting a credit count variable for that respective buffer, which indicates the number of free cells in that buffer.

Thus, the virtual output queues is segregated into two areas, a first area containing cells waiting for replication to the corresponding head of queue buffer, and a second area containing cells replicated to the head of queue buffer.

One suitable way to ensure that the credit count correctly indicates the number of free cells of the corresponding head of queue buffer, is as follows. When a new cell is being written into a virtual output queue, and the credit count of the corresponding head of queue buffer is not zero, so that a replication of the cell is transmitted to that head of queue buffer, the credit count is decreased by one. Upon the controller causing a connection to switch a cell of an ingress router through the switching matrix, a connection grant signal is transmitted to that ingress router, and increments the credit count by one. Upon determining that there is at least one cell in the first area of a given virtual output queue, and that the number of free cells of the corresponding head of queue buffer is not zero, a replication of at least one cell in the first area is transmitted to that head of queue buffer.

At an appropriate time, e.g. when the ingress router is satisfied that the head of queue buffer replicates the front of the corresponding virtual output queue, the ingress router may transmit a connection request to the controller.

Having received more than one connection request, the controller decides which to satisfy. To begin with, the controller may determine whether any given one of the received requests (e.g. among those requests in relation to cells at the front of one of the the head of queue buffers) can be satisfied without making it impossible to satisfy any of the other received requests. In this case, the controller causes that given request to be satisfied: the cell which is the subject of the request is transmitted. Otherwise (i.e. if at least two requests conflict), the controller may perform an arbitration to decide which to satisfy, e.g. according to known techniques.

As mentioned above, there may be more than one virtual output queue for each pair of ingress and egress routers. For example, the cells may be of different "types", e.g. priority levels, with a different virtual output queue (and thus a different head of line queue) for each type. In this case, the controller may determine, in tandem with which pairs of input and output ports will be connected, the priority level of the cell to be transmitted between them, and transmit that information to the switching matrix, so that a cell is transmitted from the queue having that priority level and the corresponding pair of input and output ports. The determination of which priority level to transmit may be performed by arbitration (e g. predetermined rules) according to known techniques.

Specifically, in a first aspect the present invention provides a data switching device having a plurality of ingress routers, a plurality of egress routers, a switching matrix and a connection controller, the switching matrix having input ports connected to respective said ingress routers and output ports connected to respective said egress routers, and controlled by the controller to form connections between pairs of input and output ports;

each ingress router including one or more virtual output queues for each egress router, each virtual output queue being arranged to store fixed length cells having a header defining the egress router to be used in the switching matrix connection;

each ingress router being arranged, upon receipt of a new cell by that ingress router, to store the cell in a said virtual output queue of the ingress router corresponding to the egress router for the cell;

characterized in that:

each input port of the switching matrix includes for each virtual output queue in the ingress router connected to that input port a respective head of queue buffer;

the switching matrix is arranged, upon the switching matrix forming a connection between a given input port and output port, to transmit to that output port a cell from a corresponding one of the head of queue buffers;

each egress router is arranged, upon error free receipt by that egress router of a cell from one of the virtual output queues of one of the ingress routers, to transmit a receipt signal to that ingress router;

each ingress router is arranged, upon storing a cell in a said virtual output queue, and, if a credit count, indicative of the number of free cells of the corresponding head of queue buffer, is not zero, to transmit a replication of the cell to that head of queue buffer and a connection request to the controller; and each ingress router is further arranged to retain each received cell in the corresponding virtual output queue until receiving the corresponding receipt signal.

In a second aspect, the invention provides a method of operating a data switching device having a plurality of ingress routers, a plurality of egress routers, a switching matrix and a connection controller, and the switching matrix having input ports connected to respective said ingress routers and output ports connected to respective said egress routers, and controlled by the controller to form connections between pairs of input and output ports;

the method comprising the step of:

maintaining at each ingress router one or more virtual output queues for each egress router, each virtual output queue being arranged to store fixed length cells having a header defining the egress router to be used in the switching matrix connection, and each ingress router being arranged upon receipt of a new cell to store the cell in a said virtual output queue of the ingress router corresponding to the egress router for the cell;

characterized in that the method further includes the steps of:

maintaining at each input port of the switching matrix for each virtual output queue in the ingress router connected to that input port a respective head of queue buffer;

upon the switching matrix forming a connection between a given input port and output port, the switching matrix transmitting from that input port to that output port a cell from one of the one or more corresponding head of queue buffers, and upon error free receipt by an egress router of a cell from one of the virtual output queues of one of the ingress routers, that egress router transmitting a receipt signal to that ingress router, upon receipt of a new cell by one of the ingress routers, and, if a credit count, indicative of the number of free cells of the corresponding head of queue buffer, is not zero, the ingress router transmitting a replication of the cell to that head of queue buffer and a connection request to the controller; and each ingress router retaining each received cell in the corresponding virtual output queue until receiving the corresponding receipt signal.

BRIEF DESCRIPTION OF THE DRAWINGS

An embodiment of the invention will now be described for the sake of example only with reference to the Figures, in which.

DETAILED DESCRIPTION OF EMBODIMENTS

Figure 2:
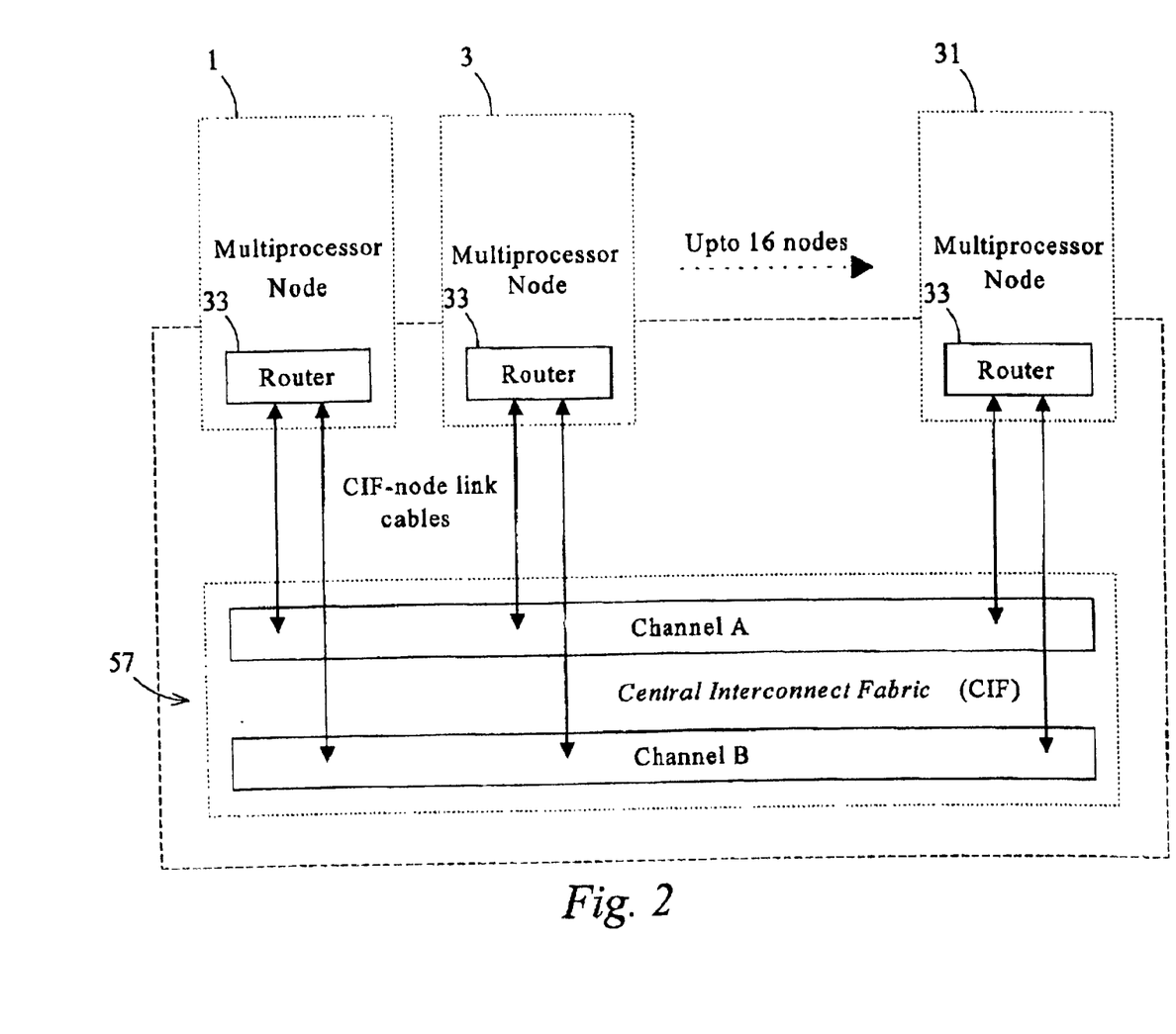
FIG. 2 shows schematically an embodiment of the present invention.

The embodiment of the present invention described herein is a development of the system described above with reference to FIG. 1, with further reductions to the latency and improvements in fault tolerance. The embodiment is illustrated in FIG. 2, which shows a system having a number (up to 16) of multi-processor nodes 1, 3, . . . 31. Each node contains a router device 33. The router devices provide the interface (both receiving and transmitting information) between each processing node and a central interconnect fabric 57.

The fabric 57 is organised as two independent channels with separate power and clock domains. Each channel consists of a single master and several matrix devices, with the number of matrix devices determining the aggregate bandwidth of the fabric. The router of each node of the multiprocessor system connects into the fabric through an array of high-speed serial links operating over cables. As in the known system described above in relation to FIG. 1, the present embodiment contains 3 types of device, router devices which provide the interface between the interconnect and a processing nodes, a master device (controller) which provides the scheduling and arbitration function in the fabric and one or more matrix devices which provide the crossbar function. The transmission and reception of the nodes along a single one of the channels conforms to the structure explained above and shown in FIG. 1. That is, the routers may be bi-directional routers, in which the data input and output functions may be regarded as ingress and egress routers, and communicate (over one channel) using a master (controller) and cyclic switching matrix.

Under normal failure-free conditions, messages are routed through either of the two channels to balance traffic through the embodiment. When one channel has failed, the other channel is capable of carrying all traffic at a reduced overall bandwidth. Reliable port-to-port message delivery is ensured through the support of a node-to-node ack/nack protocol whereby every message delivery through the interconnect is reported back to the source node and any corrupted messages are automatically retransmitted.

The present embodiment incorporates the following changes from the system of GB 9828144.7 described above:

The master is given control of the selection of the class of each message in order to take over the router arbitration function.

The matrix maintains a limited store of messages to allow immediate reaction to connections generated by the master, without reference to the router. This is achieved by keeping a set of head of queue (HOQ) buffers in the matrix, one HOQ for each combination of source port, destination port, and message class. There is a 1:1 correspondence between router buffers (VOQs) and matrix HOQs to avoid this additional storage introducing any head of line blocking.

Under low load situations when message buffers are empty, they can be bypassed to achieve the minimum possible latency.

As discussed below, with these enhancements, the matrix is able to immediately action connections received from tire master, without waiting for any actions by the router: all post-master-arbitration router actions are effectively removed from the critical path, resulting in an overall port-to-port latency as low as 55 ns.

Figure 3:
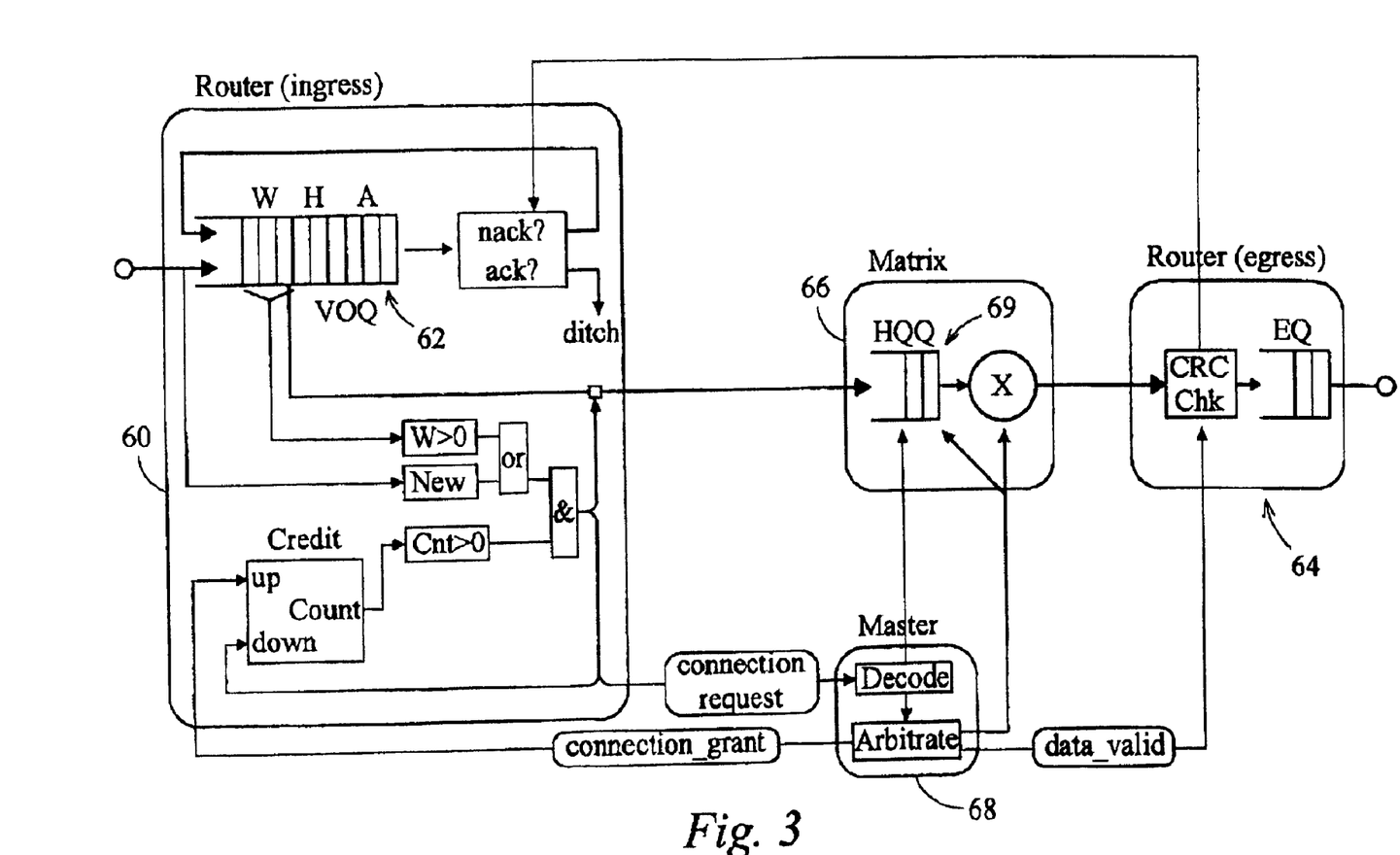
FIG. 3 shows schematically processing in the embodiment of FIG. 2.
Figure 4:
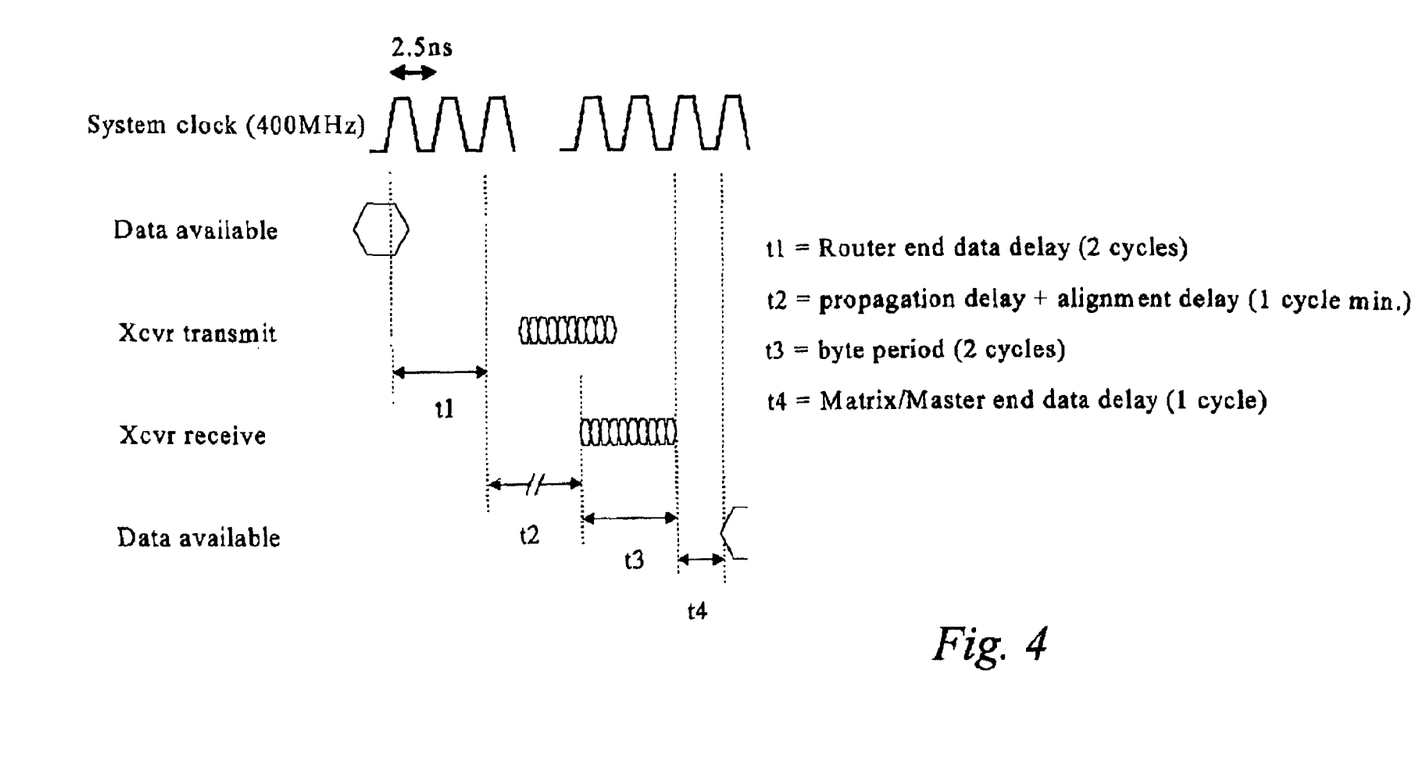
FIG. 4 illustrates the delays caused by the serial links in the embodiment of FIG. 2.

FIG. 3 is a logical view of the operation of one ingress and egress port of one channel. When a new message arrives in the ingress router 60, the class and destination are extracted from the header and the message is appended to the appropriate VOQ 62. The message is held in the VOQ 62 until its error-free receipt has later been acknowledged by the egress router 64. A plurality of matrix devices support a matrix 66, controlled by a controller (master) 68. If the corresponding HOQ 69 in the matrix devices is not full, then at the same time as writing to the VOQ a copy of the message is forwarded to the matrix devices and the router sends a connection_request to the master 68 informing it of the destination and class of the new message. The master maintains a buffer of requests it has not yet satisfied.

On receipt of the connection_request the master 68 immediately signals to the matrix devices which HOQ buffer is to receive the arriving message. This feature is necessary (in this embodiment) since each matrix device receives a different portion of the message, so typically only one of the devices would be capable of decoding this information from the message header.

The master 68 then arbitrates between competing requests and later issues a set of connections to be established by the matrix 66, one of which is for the message under consideration. The master 68 also informs the matrix of the class of message to be transferred for each connection, to identify the specific HOQ containing each message. The matrix 66 can therefore create the connection and forward the message as soon as this information arrives from the master 68. The egress router 64 is sent data_valid to indicate the arrival of the message from the matrix 66 and the ingress router 60 is sent connection_grant to indicate that a message has been forwarded from the Matrix.

When the egress router 64 receives a message it checks the message CRC field and forwards a response (ack indicating correct receipt, otherwise nack) to the originating ingress router. The egress router 64 abandons failing messages, and queues good messages in the appropriate egress queue EQ for that class from where they are transmitted to the node.

The primary means by which latency is reduced compared to the known system discussed above in relation to FIG. 1, is by inclusion of the HOQ buffers, which as explained above remove the path via the connection_grant, ingress router arbitration, and serial links to the matrix from the critical path on the arbitration of a connection by the master.

Under low load situations where a message arrives at an empty VOQ, it will be passed on to the HOQ and the connection_request will be generated simultaneously with writing it into the VOQ. This avoids the overhead of a buffer write and read.

When the master 68 receives the connection_request, if there are no competing requests for either the ingress or egress, the master 68 can bypass the normal arbitration algorithm and generate an immediate connection to the matrix 66. This replaces the normal specification of which HOQ is to receive the arriving message, and results in the matrix 66 creating the connection and passing on the message to the required destination without storing it in the (empty) HOQ.

Finally, if a message with a good CRC arrives at an empty EQ and the node (i.e. the node associated with the egress router which has received the message) is able to accept it, the message is immediately forwarded thus avoiding another unnecessary buffer read and write.

The passing of messages from the ingress router 60 to the matrix 66 is controlled by a credit protocol. This allows the ingress router 60 to know at all times whether the matrix 66 is able to accept a new message, without the overhead of a request/reply system.

The ingress router 60 maintains a credit counter for each VOQ/HOQ pair, which starts out initialised to the capacity in messages of each empty HOQ. When a message is available for transmission to the HOQ, the state of this counter is examined. If there is available credit (the counter is non-zero) the message is passed via the serial interface and the credit is decremented by one. When a connection_grant is later received indicating a message has been removed from the HOQ, the credit counter is incremented. If there is insufficient credit for a new message to be sent to the matrix, the message is stored in the VOQ and sent later when credit becomes available.

A simple extension to this scheme within the scope of the present invention would allow the system to cope with different sized messages. Instead of the credit counter simply counting whole messages, it could count message words. The counter would then be decremented or incremented by the number of words for the message being added or removed, and the criterion for being able to add a new message would be that the counter would not go negative following the decrement.

The available credit at any time is the ingress router's 60 view of the uncommitted spare capacity in that HOQ in the matrix 66.

In the system described above with relation to FIG. 1, messages are deleted from their VOQ when they are forwarded to the matrix. In the present embodiment, however, messages are retained in the VOQ until the egress router 64 reports successful receipt in order to support the reliable delivery protocol. The occupied area of the VOQ can thus conceptually divided into three areas (any or all of which can be empty):

W—This area contains messages waiting for transmission to the HOQ. This area is only occupied when there is currently no credit for further messages to the corresponding HOQ.

H—This area represents messages that have been forwarded to the HOQ and are waiting there for onward transmission to their destination.

A—This area contains messages that have been forwarded from the HOQ but for which no response (ack or nack) has yet been received.

Note that although H and A are shown as separate areas of the VOQ, these areas are conceptual: as far as the ingress router 60 is concerned, the areas H and A constitute a single area of cells which have been transmitted to the matrix 66 already. It would be possible for the router to track this boundary through the connection_grant signals, but in practice this is unnecessary and is not done.

Each arriving message is checked for a correct CRC in the egress router 64, and an ack (good) or nack (bad) response generated. A sequence number within the message header is also checked to guard against lost messages—if the sequence number of the latest message is not contiguous with the previous message, a nack response for any missing message is generated before the response for the current message. Responses generated by the egress router 64 are sent to the master 68, which then routes them back to the originating ingress router 60.

In the ingress router 60, an arriving response should always refer to the message at the head of the appropriate VOQ (this is checked by tagging messages and responses with sequence numbers). The message is removed from the VOQ: if the response is ack, the message has been correctly transferred and is therefore abandoned. If the response is nack the message is requeued into the tail of the VOQ and treated as if it were a new message.

The depth of each HOQ buffer is selected to allow operation at the full bandwidth over the credit protocol filling from the VOQs, and to provide sufficient messages to allow the scheduling and arbitration to proceed efficiently under high load conditions.

For the former requirement, consider a system where the message buffers are empty and a full bandwidth stream of messages starts arriving from the Node. For this message stream to keep flowing out to the HOQs without being queued in the VOQ region W, a new message must never encounter a zero credit. Consider the delay between the first message arrival from the Node and the return of credit for that message:

| | |
|---|---|
| connection_request generation: | 5 ns |
| Router-Master serial control interface | 20 ns |
| Master arbitration | 10 ns |
| connection_grant generation | 5 ns |
| Master-Router serial control interface | 20 ns |
| Decode and credit restoration | 5 ns |
| Total | 65 ns |

If at full bandwidth messages arrive in the Router to be sent on this channel every 10 ns, this indicates that the HOQ should hold a minimum of 7 messages to avoid lack of credit throttling the message flow. In practice of course, the master arbitration could take considerably longer than 10 ns due to port contention. Extra HOQ space would defer the onset of flow throttling in such a situation.

To provide sufficient messages to allow the scheduling and arbitration to proceed efficiently under high load conditions, consider a system where the HOQ has filled and the master 68 starts arbitrating a continuous series of connections. Assuming there is a backlog of messages waiting in the VOQ region W, the HOQ should contain enough messages to satisfy the connections until returning credit restarts the flow from the VOQ. Consider the delay between connection generation in the master and new connection_requests arriving from the router:

| | |
|---|---|
| connection_grant generation | 5 ns |
| Master-Router serial control interface | 20 ns |
| Decode and credit restoration | 5 ns |
| Message extraction from VOQ region W | 10 ns |
| connection_request generation: | 5 ns |
| Router-Master serial control interface | 20 ns |
| Total | 65 ns |

If connections are generated every 10 ns, this implies that the HOQ should contain a minimum of 7 messages to avoid any interruption to the connections while waiting for new messages from the Router.

FIGS. 4 to 8 show the sequence and timing of operations in the components of the embodiment. The latency through the embodiment has been defined from message valid in ingress router 60 to message valid and checked in egress router 64. The latency through the serial links is detailed in FIG. 4. We will now describe in detail the time taken to perform various operations.

1. Fast Message Transfer

Figure 5:
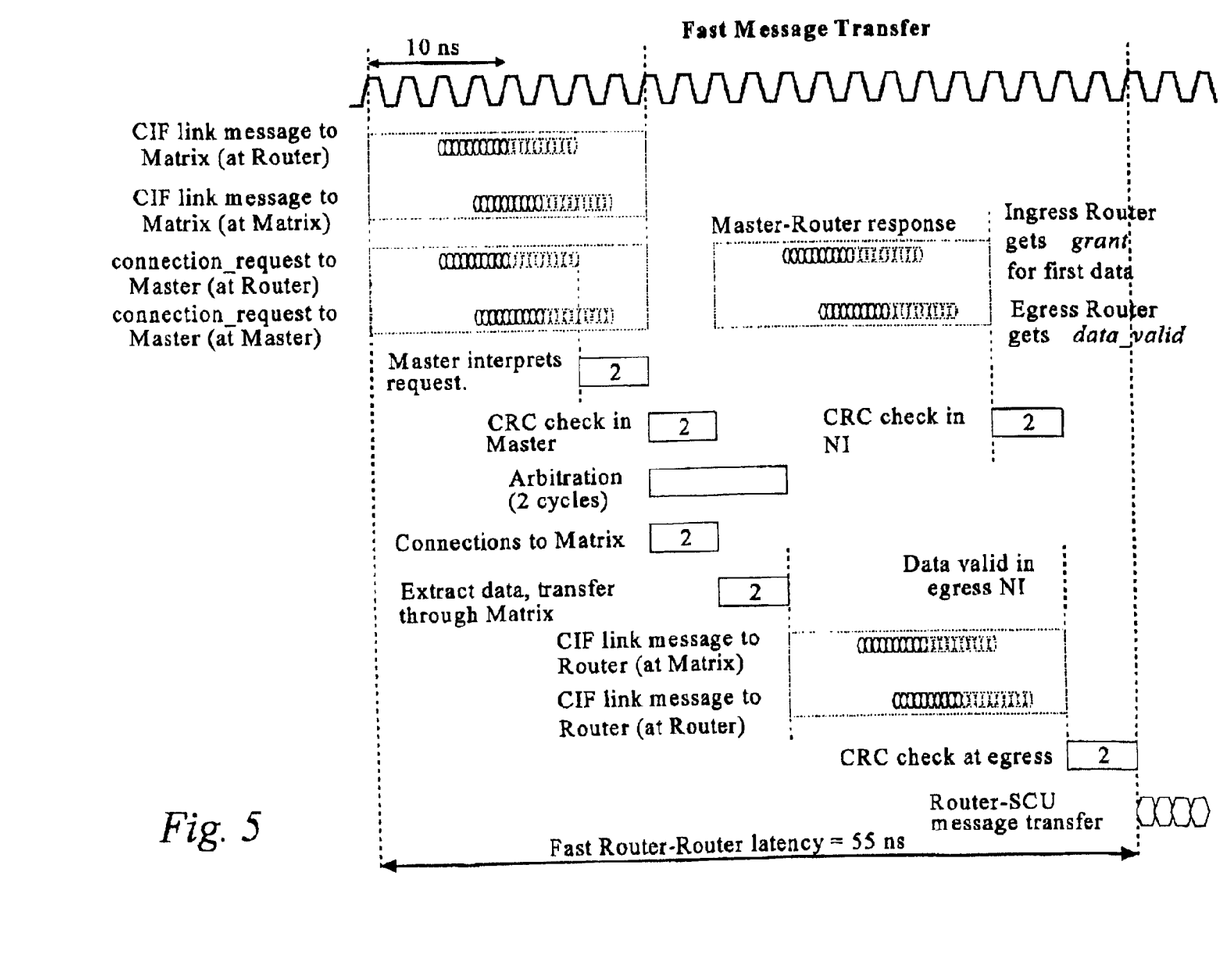
FIG. 5 illustrates processing according to the present invention in the case that an arbitration is not required.

If the master 68 receives a connection request and detects that there is no contention for the ingress and egress ports involved in that request (HOQ and arbiter status), then the master 68 can bypass the arbitration phase (which is there to resolve contention fairly) and immediately grant the connection. This "fast message transfer" feature reduces the message transfer latency when the embodiment is under condition of low load or when it is supporting stochastic, non-contentious flows.

In a fast message transfer, the HOQ routing data is not sent to the matrix device over the Master-Matrix interface since the message does not need to be stored in a HOQ.

The timescales for the operation are as set out in FIG. 5. In the absence of contention for destination ports, the embodiment supports the full port bandwidth across all ports with the 55 ns "fast message transfer" latency as shown above. The embodiment is a strictly non-blocking fabric, so there is no input or internal contention.

2. Arbitrated Message Transfer

Figure 6:
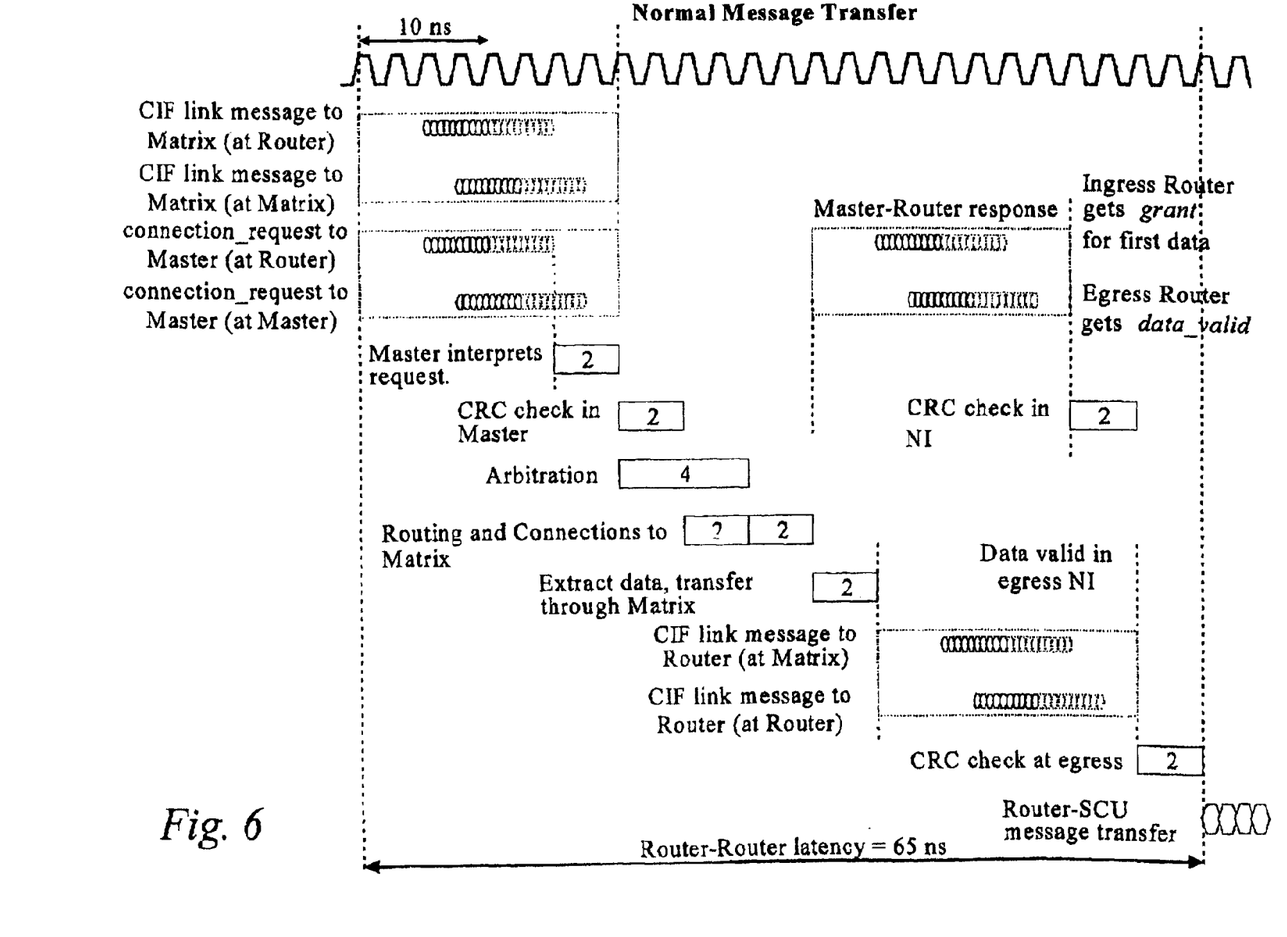
FIG. 6 illustrates processing according to the present invention in the case the an arbitration is required.

FIG. 6 shows the timing of a "normal" message transfer where there is some contention in the fabric, but where the requested message is forwarded with no extra queuing delay. In the event of contention for an output port (two or more messages in the fabric destined for delivery to the same output node), the limited bandwidth of the router-node interface forces all but one of the messages to be queued in the HOQ buffers. This queuing due to collisions between messages appears as an increase in the average latency through the fabric. The magnitude of this increase depends on the traffic patterns of the application (probability of message collisions).

Figure 7:
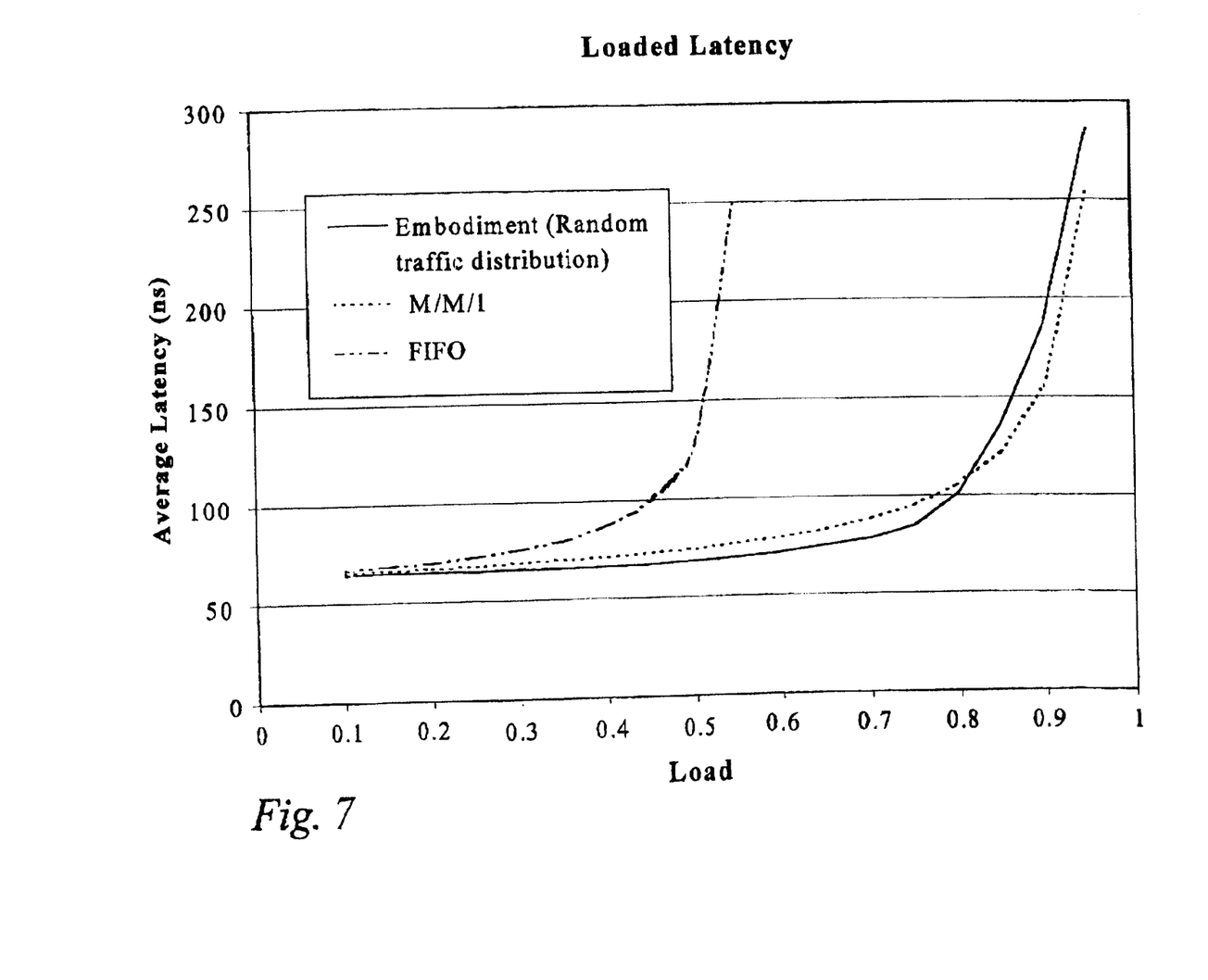
FIG. 7 illustrates the average latency according to the present invention, as compared to other switching techniques.

FIG. 7 shows the average message latency through the embodiment a 16 port TSI assuming that all ports are sending to all other ports with equal probability and with random inter-message gaps. The chart illustrates that the embodiment's performance is close to the optimal behaviour of an M/M/1 queue (that is, a Mark of/Mark of queue, a term of art which refers to a single server Q with Poisson distributed arrival rates and Poisson distributed service rates) queue, particularly compared to a simple FIFO queued fabric (no VOQs).

Note that this chart does not illustrate the effect of the fast message transfer described above (e.g. in relation to FIG. 5) which will further reduce the average latency at low loads.

It should also be noted that the increase in message latency under conditions of high loading is not a feature of the fabric, but is caused by output contention, i.e., to alleviate this effect, a node would have to be capable of accepting (and processing) messages at a faster rate (~20% faster) than an individual node could issue messages. In practice this would only serve to move the point of contention further down the dataflow without necessarily improving the overall system performance.

Figure 8:
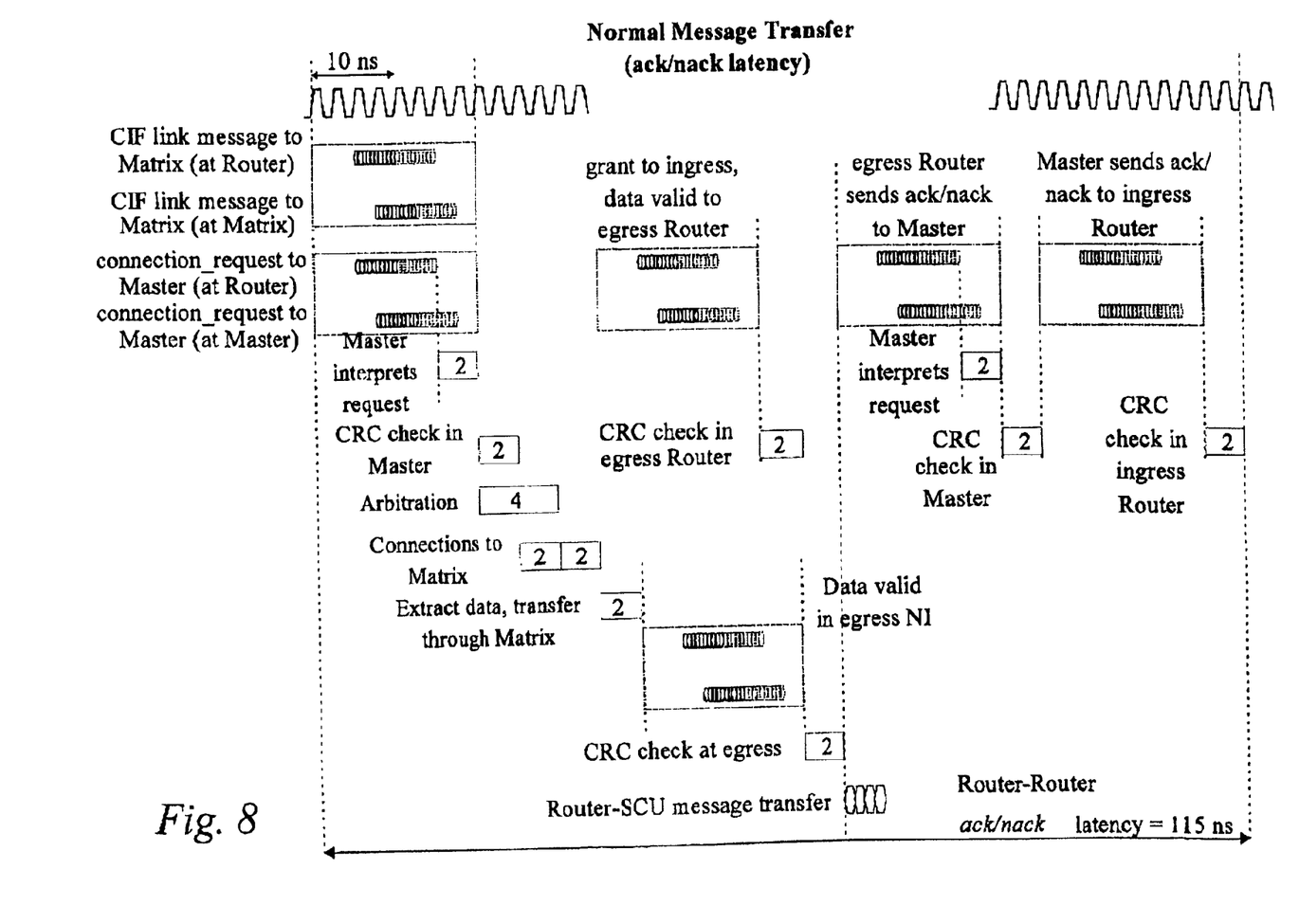
FIG. 8 illustrates processing according to the present invention including a confirmation that a cell has been correctly transmitted.

Router ack/nack latency defines the minimum depth of the VOQs required in order to maintain a full bandwidth flow between two nodes. FIG. 8 shows the normal ack/nack latency is 115 ns. With 10 ms messages, this indicates an absolute minimum VOQ depth of 12 messages for the H & A regions. The size of the W region is determined by the latency of resuming a paused interface from the Node.

Although the invention has been described above in relation to a single embodiment only, many variations are possible within the scope of the invention. For example, the present invention is not limited to multi-channel transmission. Furthermore, the present invention is not limited to data transmission between data processors, but rather may be used in any digital communication system.

Also, although the invention has been described above in relation to cells which are each sent only to a single node, the present invention is applicable also in the case of multicast signals. For example, a cell which is to be transmitted to more than one egress router may be divided by the ingress router into a plurality of cells each for transmission to a single egress router. Similarly, cells which are to be sent to multiple outputs associated with a single egress router may contain this information in their headers, so that the egress router may transmit them accordingly.

Similarly, although the cells of the present invention are usually of equal length, some of the field of a given cell may be "invalid", in the sense that they are not used to carry useful information.

What is claimed is:

1. A data switching device having a plurality of ingress routers, a plurality of egress routers, a switching matrix and a connection controller, the switching matrix having input ports connected to respective said ingress routers and output ports connected to respective said egress routers, and controlled by the controller to form connections between pairs of input and output ports;

each ingress router including one or more virtual output queues for each egress router, each virtual output queue being arranged to store fixed length cells having a header defining the egress router to be used in the switching matrix connection;

each ingress router being arranged, upon receipt of a new cell by that ingress router, to store the cell in a virtual output queue of the ingress router corresponding to the egress router for the cell;

characterized in that:

each input port of the switching matrix includes for each virtual output queue in the ingress router connected to that input port a respective head of queue buffer;

the switching matrix is arranged, upon the switching matrix forming a connection between a given input port and output port, to transmit to that output port a cell from a corresponding one of the head of queue buffers;

each egress router is arranged, upon error free receipt by that egress router of a cell from one of the virtual output queues of one of the ingress routers, to transmit a receipt signal to that ingress router;

each ingress router is arranged, upon storing a cell in a virtual output queue, and, if a credit count, indicative of the number of free cells of the corresponding head of queue buffer, is not zero, to transmit a replication of the cell to that head of queue buffer and a connection request to the controller; and each ingress router is further arranged to retain each received cell in the corresponding virtual output queue until receiving the corresponding receipt signal.

2. A device according to claim 1 in which, upon the controller causing a connection to switch a cell of an ingress router through the switching matrix, a connection grant signal is transmitted to that ingress router, and increments the credit count by one.

3. A device according to claim 1 in which, upon said replication of the cell to the head of queue buffer, the respective credit count is decremented by one.

4. A device according to claim 1 in which the virtual output queues are segregated into two areas, a first area containing cells waiting for replication to the corresponding head of queue buffer, and a second area containing cells replicated to the head of queue buffer, and, upon determining that there is at least one cell in the first area and that the number of free cells of the corresponding head of queue buffer is not zero, a replication of at least one cell in the first area is transmitted to that head of queue buffer, the cell is transferred to the second area, and a connection request is transmitted to the controller.

5. A device according to claim 4 in which, upon receiving the re-transmission request, the ingress router transfers the corresponding cell in the second area into the first area, and transmits a corresponding connection request to the controller.

6. A device according to claim 1 in which each cell is associated with a priority level, said virtual output queues comprising a virtual output queue for cells of each respective priority level, said controller determining, in tandem with which pairs of input and output ports will be connected, the priority level of the cell to be transmitted between them.

7. A device according to claim 1 in which the controller determines whether any given one of the cells in the virtual output queues can be transmitted between the appropriate pair of input and output ports without preventing the transmission of a cell in a virtual output queue between another pair of input and output ports, and in this case causes that given cell to be transmitted.

8. A device according to claim 1 in which each egress router is arranged to detect that a cell transmitted by the switching matrix has not been received correctly, and in this case transmits a re-transmission request to the corresponding ingress router.

9. A method of operating a data switching device having a plurality of ingress routers, a plurality of egress routers, a switching matrix and a connection controller, and the switching matrix having input ports connected to respective said ingress routers and output ports connected to respective said egress routers, and controlled by the controller to form connections between pairs of input and output ports;

the method comprising the step of:

maintaining at each ingress router one or more virtual output queues for each egress router, each virtual output queue being arranged to store fixed length cells having a header defining the egress router to be used in the switching matrix connection, and each ingress router being arranged upon receipt of a new cell to store the cell in a said virtual output queue of the ingress router corresponding to the egress router for the cell;

characterized in that the method further includes the steps of:

maintaining at each input port of the switching matrix for each virtual output queue in the ingress router connected to that input port, a respective head of queue buffer;

upon the switching matrix forming a connection between a given input port and output port, the switching matrix transmitting from that input port to that output port a cell from one of the one or more corresponding head of queue buffers, upon error free receipt by an egress router of a cell from one of the virtual output queues of one of the ingress routers, that egress router transmitting a receipt signal to that ingress router, upon receipt of a new cell by one of the ingress routers, and, if a credit count, indicative of the number of free cells of the corresponding head of queue buffer, is not zero, the ingress router transmitting a replication of the cell to that head of queue buffer and a connection request to the controller; and each ingress router retaining each received cell in the corresponding virtual output queue until receiving the corresponding receipt signal.

10. A method according to claim 9 in which, upon the controller causing a connection to switch a cell of an ingress router through the switching matrix a connection grant signal is transmitted to that ingress router, and increments the credit count by one.

11. A method according to claim 9 in which, upon said replication of the cell to the head of queue buffer, the respective credit count is decremented by one.

12. A method according to claim 9 in which the virtual output queues are segregated into two areas, a first area containing cells waiting for replication to the corresponding head of queue buffer, and a second area containing cells replicated to the head of queue buffer, and, upon determining that there is at least one cell in the first area and that the number of free cells of the corresponding head of queue buffer is not zero, a replication of at least one cell in the first area is transmitted to that head of queue buffer, the cell is transferred to the second area, and a connection request is transmitted to the controller.

13. A method according to claim 12 in which, upon receiving the re-transmission request, the ingress router transfers the corresponding cell in the second area into the first area, and transmits a corresponding connection request to the controller.

14. A method according to claim 9 in which each cell is associated with a priority level, said virtual output queues comprising a virtual output queue for cells of each respective priority level, said controller determining, in tandem with which pairs of input and output ports will be connected, the priority level of the cell to be transmitted between them.

15. A method according to claim 9 in which the controller determines whether any given one of the cells in the virtual output queues can be transmitted between the appropriate pair of input and output ports without preventing the transmission of a cell in a virtual output queue between another pair of input and output ports, and in this case causes that given cell to be transmitted.

16. A method according to claim 9 in which each egress detects that a cell transmitted by the switching matrix has not been received correctly, and in this case transmits a re-transmission request to the corresponding ingress router.

* * * * *